United States Patent
Stemberg et al.

(10) Patent No.: US 11,867,145 B2
(45) Date of Patent: Jan. 9, 2024

(54) ROTOR BLADE FOR A WIND POWER INSTALLATION, WIND POWER INSTALLATION, AND METHOD FOR DESIGNING A ROTOR BLADE

(71) Applicant: Wobben Properties GmbH, Aurich (DE)

(72) Inventors: Jochen Stemberg, Aurich (DE); Hauke Maass, Bremen (DE); Henry Knobbe Eschen, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/497,220

(22) Filed: Oct. 8, 2021

(65) Prior Publication Data
US 2022/0112874 A1    Apr. 14, 2022

(30) Foreign Application Priority Data
Oct. 9, 2020   (DE) .......................... 102020126484.4

(51) Int. Cl.
*F03D 1/06*         (2006.01)

(52) U.S. Cl.
CPC ........ *F03D 1/0633* (2013.01); *F05B 2230/50* (2013.01); *F05B 2240/304* (2020.08); *F05B 2250/711* (2013.01)

(58) Field of Classification Search
CPC .. F03D 1/0633; F03D 1/0641; F05B 2230/50; F05B 2240/304; F05B 2250/711
See application file for complete search history.

(56) References Cited

U.S. PATENT DOCUMENTS

| | | | | |
|---|---|---|---|---|
| 8,517,690 B2 * | 8/2013 | Nagy | .................... | F03D 1/0641 |
| | | | | 416/243 |
| 8,814,525 B2 * | 8/2014 | Petsche | ................. | F03D 1/0641 |
| | | | | 416/243 |
| 8,944,775 B2 | 2/2015 | Fuglsang et al. | | |
| 9,932,960 B2 * | 4/2018 | Petsche | ................ | F03D 1/0633 |
| 10,151,296 B2 * | 12/2018 | Dent | .................... | F03D 1/0641 |
| 2008/0240923 A1 | 10/2008 | Bonnet | | |

(Continued)

FOREIGN PATENT DOCUMENTS

| | | |
|---|---|---|
| CN | 106050566 A | 10/2016 |
| DE | 102008052858 A1 | 4/2010 |

(Continued)

*Primary Examiner* — Courtney D Heinle
*Assistant Examiner* — Sang K Kim
(74) *Attorney, Agent, or Firm* — Seed IP Law Group LLP

(57) ABSTRACT

A rotor blade for a wind power installation, which extends in a longitudinal direction with a profile course from a blade connector to a blade tip, wherein the profile course contains at least one profile, comprising: a suction side and a pressure side, a relative profile thickness of greater than 25%, a profile chord, which extends between a leading edge and a trailing edge of the profile and has a length which defines the profile depth, a mean line which extends at least partially below the profile chord, a convex region which extends on the suction side from the trailing edge, and a convex region which extends on the pressure side from the trailing edge, wherein the convex region on the pressure side defines a rounded transition region of the pressure side to the trailing edge.

6 Claims, 8 Drawing Sheets

(56) References Cited

U.S. PATENT DOCUMENTS

| | | |
|---|---|---|
| 2016/0298600 A1 | 10/2016 | Tian et al. |
| 2019/0024627 A1* | 1/2019 | Zamora Rodriguez ................... F03D 1/0633 |
| 2021/0079886 A1* | 3/2021 | Kneissl ................ F03D 1/0641 |
| 2022/0228551 A1* | 7/2022 | Maass .................. F03D 1/0641 |

FOREIGN PATENT DOCUMENTS

| | | |
|---|---|---|
| DE | 102013202666 A1 | 8/2014 |
| DE | 202016101461 U1 | 5/2016 |
| DE | 102019113085 A1 | 11/2020 |
| EP | 1944505 A1 | 7/2008 |
| WO | 2007/115861 A1 | 10/2007 |
| WO | 2009/068719 A1 | 6/2009 |

* cited by examiner

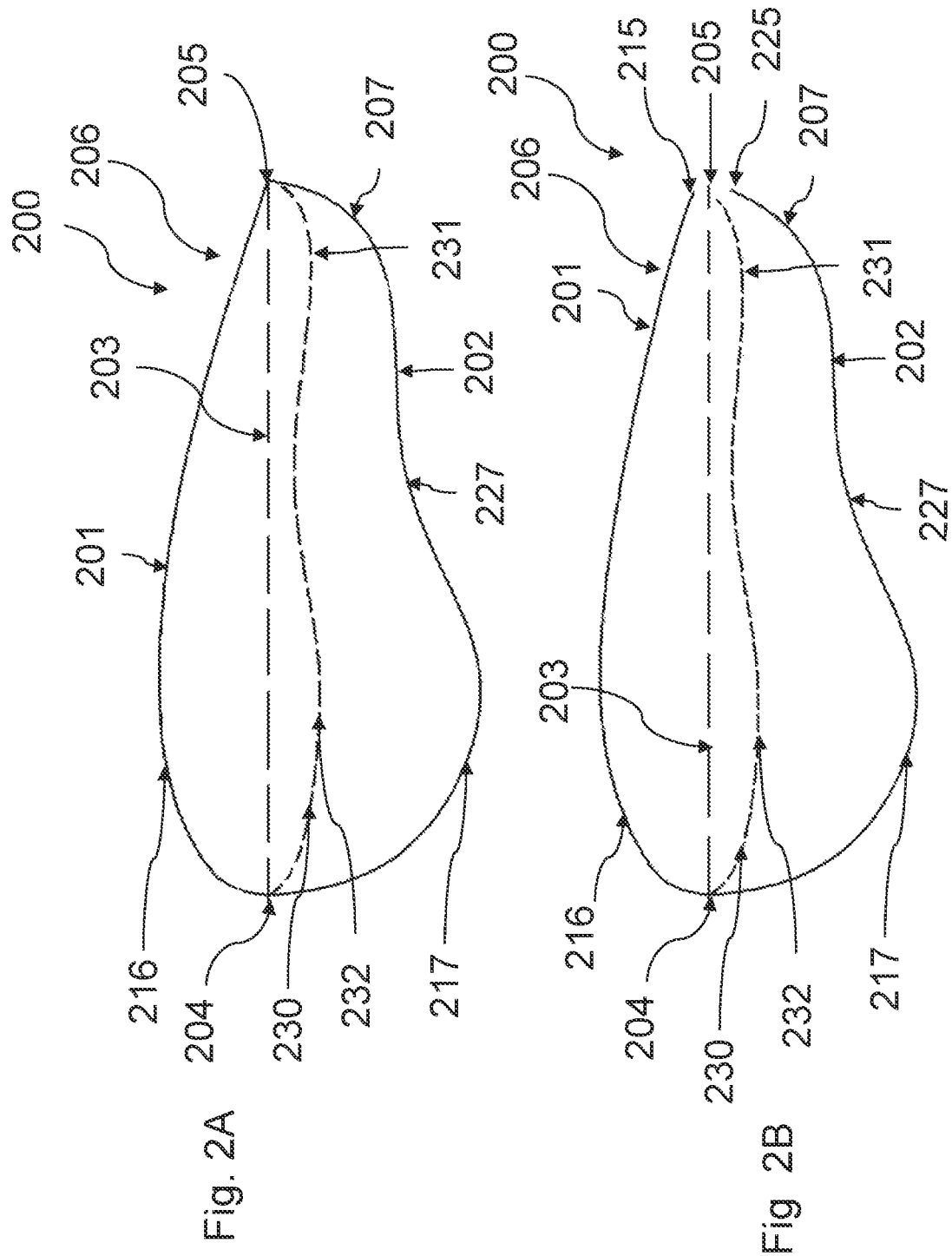

ROTOR BLADE FOR A WIND POWER INSTALLATION, WIND POWER INSTALLATION, AND METHOD FOR DESIGNING A ROTOR BLADE

BACKGROUND

Technical Field

The disclosure relates to a rotor blade for a wind power installation, to a rotor for a wind power installation, and to a method for designing a rotor blade.

Description of the Related Art

Wind power installations have a rotor with at least one, two or more rotor blades, preferably three rotor blades, and are designed to generate mechanical rotational energy from kinetic wind energy and to generate electrical energy from said mechanical rotational energy. Such wind power installations are generally known and as a rule comprise a nacelle, on which the rotor is arranged, and a tower, on which the nacelle with the rotor is arranged so as to be rotatable about a substantially vertically oriented axis.

Wind power installations are generally designed as so-called horizontal-axis wind power installations, which comprise a rotor with a substantially horizontal axis whose rotor blades rotate in a plane substantially perpendicular to the wind. Such horizontal-axis wind power installations use the aerodynamic principle of lift to convert the kinetic wind energy into mechanical rotational energy. In this case, a profile of a rotor blade forms a suction side and a pressure side such that, when moving air flows around the profile, a negative pressure is formed on the suction side in relation to the pressure side. The resulting pressure difference between the pressure side and the suction side leads to an aerodynamic lift. In this case, the lift is dependent for example on an angle of attack of the rotor blades.

Known rotor blades are disadvantageous to the extent that the attached air flow, in particular on a suction side, detaches and a so-called "stagnation zone" with a separated flow is formed. In particular at relatively large angles of attack, the flow can no longer be evenly attached to a profile of a rotor blade and detaches. The stagnation zone reduces the lift of the rotor blade, and slows the rotor blade down by increasing the drag thereof. This reduces an efficiency of the rotor and thus also a yield of a wind power installation.

Various solutions are known for improving the aerodynamic properties of rotor blades and for increasing efficiency. For example, it is known to use rotor blades with a flat trailing edge, so-called flat back profiles, in particular in the inner region. For the production of such thick profiles, with a flat trailing edge which is sharp on the pressure side and on the suction side, additional foam inserts are generally required. Therefore, the production is, in terms of construction, highly cumbersome and associated with increased costs, in particular with additional material costs, high personnel costs and manufacturing costs.

Such rotor blades are disadvantageous in particular to the extent that, at high wind speeds, undesired vibrations frequently occur. Flutter, a combined bending and torsional vibration, constitutes a known dynamic instability of a rotor blade. Flutter, that is to say in particular mutual excitation of aerodynamic forces, elastic forces and mass forces, can arise if the rotor blade is excited to perform an oscillatory movement. Such states are hazardous particularly since vibrations can add up through more and more energy being absorbed from air flowing around, whereby, for example, the rotor blades can be damaged. A rotor rotational speed of the wind power installation above which there is the risk of the rotor blades having a tendency to undergo flutter should therefore generally lie sufficiently far outside normal operating limits. In particular with rotor blades becoming larger and simultaneously lighter in the future, there is an increase in the risk of the rotor blade undergoing flutter even at relatively low wind speeds.

For this reason, only at wind power installations with a relatively small rotor diameter can the advantages which can be achieved by the flat back profiles be utilized in an economical manner at high rated power, for example at 3 MW rated power and a rotor capacity of greater than 500 W/m$^2$ or at 3 MW rated power and a rotor capacity of 374 W/m$^2$ or at 4.2 MW rated power and a rotor capacity of 337 W/m$^2$.

For the purpose of saving costs, however, wind power installations are increasingly being designed in particular such that they have a rotor capacity of less than 300 W/m$^2$. This generally makes it possible to achieve more full-load operation time with reduced generator costs and with reduced installation loads. However, the effect of this design is in particular that, even at relatively low wind speeds, a power generated in the inner rotor blade region sometimes has to be nullified again in the outer region in order to be able to reduce the torque at the generator. The wind power available in a rotor stream tube can, in particular in this operating state, be significantly higher than a power that can be dissipated via the generator. It is known for example to nullify surplus power through pitching of the rotor blades. However, this can give rise in particular to flow separation at the blade tip, which can again lead to undesired vibrations and in particular flutter of the rotor blade.

For avoiding abovementioned disadvantageous operating states, the wind power installation is to be deactivated in particular even at relatively low wind speeds, in particular from a wind speed of 15 m/s or 20 m/s or 25 m/s. However, this storm control with earlier implementation results in the occurrence of significant losses of yield.

In the aviation industry, it is known for example to reduce or prevent abovementioned disadvantages through power reduction by means of lift reduction or significant increasing of drag, in particular at the blade root and the blade center. Known measures for this are for example brake flaps, curved flaps, spoilers and split flaps. The technical complexity and the associated maintenance effort are disadvantageous, however. Owing to said disadvantages, the application of such measures in wind power installations is not economical.

The existing devices for increasing efficiency and/or for avoiding undesired vibrations and flutter movements offer various advantages, but further improvements are desirable.

BRIEF SUMMARY

Provided is a rotor blade for a wind power installation, a wind power installation and/or a method for designing a rotor blade that, in many embodiments, reduce or eliminate one or more of the above disadvantages. In one or more embodiments, provided are techniques for further increasing the efficiency of a rotor blade of a wind power installation for high installation economy and, at the same time, for preventing flutter movements of the rotor blade. In particular, the techniques reduce the outlay and the complexity of the production of the rotor blade and also the production costs.

According to a first aspect, provided is a rotor blade for a wind power installation, which extends in a longitudinal direction with a profile course from a blade connector to a blade tip, wherein the profile course contains at least one profile, comprising: a suction side and a pressure side, a relative profile thickness of greater than 25%, a profile chord, which extends between a leading edge and a trailing edge of the profile and has a length which defines the profile depth, a mean line which extends at least partially below the profile chord, a convex region which extends on the suction side from the trailing edge, and a convex region which extends on the pressure side from the trailing edge, wherein the convex region on the pressure side defines a rounded transition region of the pressure side to the trailing edge.

The disclosure is based on the realization that undesired vibrations, and in particular flutter of the rotor blade, at high wind speeds are attributable, in particular, to large negative angles of attack at the rotor blade tip, which occur if, at very high wind speeds, in particular, at wind speeds above a wind speed at which the rated power is reached, preferably at a wind speed of greater than 15 m/s (meters per second), a power generated in the inner rotor blade region has to be reduced, or even sometimes nullified again, in the outer region in order to be able to reduce the torque at the generator. The wind power available in a rotor stream tube is therefore, in this operating state, preferably significantly higher than a power which can be dissipated via the generator. The surplus power can be reduced or nullified, in particular, through pitching of the rotor blades and, at high wind speeds, lead to flow separation at the blade tip. Said flow separation can cause the undesired vibrations and in particular the flutter of the rotor blade.

The inventors have found that flat back-profile roundings at transitions to a flat trailing edge, in particular at the pressure-side flow-off edge, can lead to considerable reductions in lift even for small radii. For example, a radius at the rounded transition region of the pressure side of approximately 5% of the length of the profile chord at a profile with a relative profile thickness of approximately 45% can lead to a reduction in lift by 30% to 80%.

In the solution described here, provision is made of a rotor blade having at least one profile which has, from the trailing edge, a convex region both on the suction side and on the pressure side.

The rounded transition region of the pressure side to the trailing edge allows a locally produced power, at high wind speeds, to be reduced by a loss in the lift potential. In particular, by a reduction of a power produced by the blade root, more power can be generated at an outer portion at relatively large angles of attack.

A further advantage of the present solution is that, by way of the defined rounding of the transition region, lift coefficients can be adapted according to requirement. In particular, the geometry of the rotor blade can be configured differently along the rotor blade length according to requirement. Here, it is advantageous that the geometry of individual profiles can be adapted according to the mean annual wind speed. It is furthermore advantageous that, through the proposed solution, overall, it is possible to increase an efficiency of a wind power installation and consequently, in particular, an annual yield.

Moreover, the production outlay for such profiles and/or rotor blades and the production costs can be significantly reduced. In particular, with relocation of a shell parting or mold parting to the suction-side trailing edge, the profile can be demolded significantly more easily than known flat back profiles. Furthermore, with the production of such profiles and/or rotor blades, material can be saved and consequently the material costs can be reduced. In this way, it is also possible, in particular, to reduce a total weight of the rotor blade.

The rotor blade extends, in particular in the longitudinal direction, in the direction of a rotor blade length and extends in the direction of a rotor blade depth and of a rotor blade thickness. In the direction of the rotor blade length, the rotor blade extends between the blade connector and the blade tip. The rotor blade depth is oriented in particular substantially orthogonally to the rotor blade length and extends between the leading edge and the trailing edge. During operation, the rotor blade depth is oriented substantially parallel to a flow-on direction of the rotor blade. The rotor blade extends in the direction of the rotor blade thickness in particular substantially orthogonally to the direction of the rotor blade length and of the rotor blade depth. The rotor blade depth and the rotor blade thickness define an aerodynamic profile in particular at substantially every position along the rotor blade length.

Preferably, the trailing edge may have a suction-side flow-off edge, also referred to as suction-side trailing edge, and a pressure-side flow-off edge, also referred to as pressure-side trailing edge. The suction-side flow-off edge and the pressure-side flow-off edge may in this case in particular be at a distance from one another, in the form of a so-called flat back profile, that is to say a profile with a flat trailing edge. In this case, it is in particular possible for the rotor blade to have at its rear end, that is to say at the trailing edge, a specific trailing edge height and accordingly to substantially not narrow to a point. As trailing edge, use then may be made, for determining the profile depth, in particular of a position, preferably a central point, between suction-side flow-off edge and pressure-side flow-off edge. Alternatively, it is preferably possible for the profile to have a closed trailing edge. In the case of a closed trailing edge, the profile chord may extend, preferably from the leading edge, to a point to which the profile converges, said point being referred to as trailing edge. Preferably, the pressure-side, rounded transition region may extend to the suction-side flow-off edge and describe in particular a convex runout of the pressure side. The leading edge may preferably be a point of the profile nose that is at the furthest distance from the trailing edge.

The suction side of the rotor blade may correspond in particular to a surface of the rotor blade that, during the operation of the wind power installation, generates lift and, when air flows around, thereby drives the rotation of a rotor to which the rotor blade is fastened. The pressure side may in particular be opposite the suction side.

In particular, the profile course of the rotor blade may have a number of profiles, also referred to as profile sections, which define the outer contour of the rotor blade. A rotor blade generally comprises a plurality of different profiles. The profiles are intended to make possible a substantially aerodynamically optimum flow course at the various radius positions of a rotor blade.

A mean line, also referred to as profile midline, camber line or line of curvature, may be understood as meaning in particular a connecting line of the center points of the circles inscribed in the profile. Preferably, the mean line may be defined as a line comprising the center points between the suction side and the pressure side perpendicular to an X coordinate of the profile or the profile chord.

Preferably, a relative profile thickness may be understood as meaning a maximum thickness of the profile perpendicular to the profile chord in relation to the profile chord length. Preferably, a relative profile thickness of at least 45% may be provided.

Where reference is made in the present case to directional indications relative to the profile chord, such as for example below or above, "below" refers in particular to a position in a region between the profile chord and the pressure side and/or "above" refers to a position in a region between the profile chord and the suction side.

The rotor blade, in particular the profile with the rounded transition region of the pressure side to the trailing edge, may be used in particular if profile sections with large relative profile thicknesses, in particular of greater than 25%, are used and an adaptation of lift coefficients is required or at least desirable.

The profiles can, particularly advantageously and in an economical manner, be used in a hub portion and/or a middle portion of rotor blades of a wind power installation. The use of the profiles is not however restricted to the use in the hub portion and/or the middle portion of rotor blades of a wind power installation.

The rotor blade may preferably comprise an inner portion, which adjoins the blade connector, and an outer portion, which adjoins the blade tip. Particularly preferably, the profile may be provided in the inner portion. Preferably, the outer portion may extend between 80% and 100% of a relative rotor blade length. Preferably, the inner portion may extend between 0% and 80% of a relative rotor blade length. The inner portion may preferably comprise the hub portion and the middle portion, wherein the hub portion adjoins the blade connector and the middle portion adjoins the hub portion and the outer portion, which may in particular also be referred to as tip portion, wherein preferably the profile is provided at least partially in the middle portion and/or the hub portion. Particularly preferably, the hub portion may extend between 0% and 30% of the relative rotor blade length and the middle portion may extend between 30% and 80% of the relative blade length.

Preferably, the rounded transition region may have a radius. The radius may preferably be of any magnitude. In particular, the rounded transition region may have different radii. Particularly preferably, the radius or the radii or at least one radius of the radii may have at least 5% of the profile chord length.

Particularly preferably, the suction-side flow-off edge may be formed as a sharp flow-off edge with a radius equal to zero or approximately zero.

Preferably, the convex region on the suction side and/or the convex region on the pressure side may extend from the trailing edge in the direction of the leading edge with an extent of at most 1% of the length of the profile chord, preferably of at most 5% to at most 30% of the length of the profile chord, preferably of up to at most 40% of the length.

A particularly preferred embodiment is distinguished in that an arrangement for aerodynamic flow manipulation is arranged on the rounded transition region, wherein preferably the arrangement is in the form of a Gurney flap or a split flap.

Alternatively, it is possible for example for the arrangement to be in the form of an air outlet. By way of outflowing air at the air outlet, it is possible in particular for aerodynamic flow manipulation to be achieved.

The inventors have found that a loss in lift caused by the rounding of the transition region can be reduced or completely compensated by the arrangement for aerodynamic flow manipulation at said transition region. Furthermore, in particular by way of the arrangement, a drag is not significantly influenced in comparison with a conventional flat back profile.

This preferred embodiment is advantageous in particular to the extent that the profile can be varied with regard to lift power and the rotor blade can be designed according to requirement, in particular according to the mean annual wind speed.

A further advantage of this configuration is in particular that it is possible to reduce a production outlay for a rotor blade with a high lift potential. Furthermore, it is in particular possible to dispense with the need for complex production techniques, such as for example the use of foam inserts or of separately produced mold elements.

A preferred development of the rotor blade is distinguished in that the arrangement is arranged on the rounded transition region at an angle of greater than 90° to a local target flow-on direction, in particular of greater than 100° to a local target flow-on direction.

According to this preferred development, the arrangement, preferably the Gurney flap or the split flap, may in particular extend from a surface of the pressure side at an angle of greater than 90° to the local target flow-on direction, in particular of greater than 100° to the local target flow-on direction.

It is alternatively possible for example for the air outlet to be arranged on the surface of the pressure side such that there is an angle of greater than 90°, in particular of greater than 100°, between the local target flow-on direction and the direction of the exiting air.

By way of this configuration, cost-optimized production of the rotor blades can be ensured. It is furthermore advantageous that the arrangement makes possible an adaptation of a height course for realizing a location-specific lift distribution at the rotor blade. By way of these location-specific rotor blade adaptations, it is possible for example to increase the annual energy yield, or to mitigate the effects of certain location-specific load situations, and in this way to make possible the operation of certain wind power installations at locations which would otherwise be excluded owing to excessively high loads.

A local flow-on direction may be characterized in particular by the resultant of the wind velocity and the velocity of the rotor blade tip. Therefore, in particular in the case of a change in wind speed at constant rotor rotational speed and constant angle of attack of the rotor blade, a change in the local flow-on direction and thus also of a flow-on angle between the flow-on direction and the profile chord occurs. This can bring about in particular a change in the lift force acting on the rotor blade and thus ultimately a change in the efficiency of the rotor. In particular in the case of pitch-controlled wind power installations, it is possible by way of turning of the rotor blades and the consequent change in the angle of attack for a local target flow-on direction to be set and/or to be kept approximately constant.

In particular, it is preferable for the arrangement to have a length of between 0.1% and 40% of the profile depth, wherein preferably the relative profile thickness of the profile is at most 30% and the length of the arrangement is at most 10% of the profile depth, or is greater than 30% and the length of the arrangement is at most 40% of the profile depth.

In particular, the length may extend from the surface of the pressure side to an outer contour edge of the arrangement. The length, and in particular the outer contour edge, may be defined, for example in the case of an air outlet, by exiting air too.

Preferably, a distance between the outer contour edge of the arrangement and the suction-side flow-off edge may be at least 0.1% to 40% of a maximum profile thickness which is established between the suction side and the pressure side.

Particularly preferably, a length of the arrangement of a first profile, which is at a first distance from the blade root, may be greater than a length of the arrangement of a second profile, which is at a second distance from the blade root, wherein the second distance is greater than the first distance.

Particularly preferably, the length of the arrangement of a profile in the inner portion, in particular the hub portion, may be between 10% and 40% of the maximum profile thickness which is established between the suction side and the pressure side. Preferably, the length of the arrangement of a profile in the middle portion and/or the outer portion may be between 0.1% and 5%.

Preferably, the radius or radii of the rounded transition region may be between 0% and 100% of the distance between the outer contour edge of the arrangement and the suction-side flow-off edge.

Particularly preferably, an imaginary connecting line between the outer contour edge of the arrangement and the suction-side flow-off edge may preferably be oriented substantially orthogonally to the target flow-on direction. The inventors have recognized that said imaginary connecting line can correspond in particular to a blunt trailing edge of a known flat back profile.

Preferably, the imaginary connecting line between the outer contour edge of the arrangement and the suction-side flow-off edge may be oriented with an inclination to the target flow-on direction of substantially greater than 90°, in particular between 90° and 120°. In this case, the arrangement may in particular project beyond a contour of a known flat back profile. This can result in particular in a relatively large drag and relatively large moment coefficients and also an increase in lift and an enlargement of the effectively active surface on the pressure side. Overall, it is consequently possible in particular for a reduction in the total drag and/or an optimization of the lift to be achieved.

Such profiles may be formed in the profile course in particular at a transition to a circular cylinder at the rotor blade root, since it is here in particular that the largest possible lift coefficients are sought. By way of this additionally achievable lift, the rotor blade can preferably be additionally stabilized to avoid flow separation in operating states with large angles of attack. Such large angles of attack can occur in particular in the upper part-load range if the rated power has not yet been reached but a departure from the optimum tip speed ratio has already been necessary owing to limitations of the blade tip speed.

A further preferred development of the rotor blade is distinguished in that the arrangement can be moved from a first position, in which the distance between the outer contour edge of the arrangement and the suction-side flow-off edge is at least 10% of the maximum profile thickness which is established between the suction side and the pressure side, in the direction of a second position, which describes a lift-reduced configuration in which the distance between the outer contour edge of the arrangement and the suction-side flow-off edge is reduced.

This makes possible intense and in particular requirement-dependent variation of the lift power. Preferably, an increase in yield can be achieved through the possibility of precise setting of the arrangement. Furthermore, it is possible for example for critical operating states and load minimizations to be avoided.

The arrangement may preferably be pivotable about an inner contour edge which is arranged on the pressure side.

Particularly preferably, the arrangement may be retractable and extendable, wherein preferably the retracted position describes the second position, wherein preferably, in the second position, the arrangement is inwardly recessed relative to a plane which is congruent with a pressure-side surface. In particular, in the first position, the arrangement may project outwardly relative to said plane.

It is particularly preferable for the arrangement to be configured to be actively controllable for lift control. In particular, the arrangement may comprise an actuator, which may be actuated by a control unit, for movement of the arrangement from the first position into the second position and from the second position into the first position and/or into any desired further position between the first position and the second position.

In this way, the arrangement can in particular be set precisely, and in a manner targeted according to requirement, to achieve an increase in yield and, in the case of a storm, to avoid critical operating states and load minimizations.

This preferred embodiment is advantageous in particular to the extent that, in terms of its lift power, the profile can be varied with an intensity according to requirement. This configuration allows the power generated locally, in particular by the rotor blade root and the blade center region, to be reduced in a targeted manner, preferably at high wind speeds, in order for large negative angles of attack to be avoidable locally, in particular at the rotor blade tip. In this way, storm deactivation of the wind power installation can be delayed until larger wind speeds are reached, and consequently an increase in yield, in particular at locations with strong wind, can be achieved.

By way of the actively controllable arrangement, it is possible in particular for the local lift coefficient at profiles to be adapted over a wide range to the respective operating state of the wind power installation. Thus, for each operating state, it is possible to realize an optimized induction factor distribution which has in particular a significantly performance-improving effect.

For example, the arrangement may be in the form of a Gurney flap, in particular as a hinge, elastic flap or linear element with actuator or as inflatable contour, and be formed to be actively controllable.

In a further preferred embodiment variant of the rotor blade, it is provided that the mean line extends below the profile chord, and/or has a mathematically positive curvature, in a region in which the mean line is defined by the convex region extending on the pressure side from the trailing edge and the convex region extending on the suction side from the trailing edge.

In particular, the convex region on the pressure side may have greater convexity than the convex region on the suction side.

Preferably, the mean line may extend steeply in the direction of the suction side in an end region. In particular, slopes of tangents in the end region may be steeper than slopes of tangents before the end region. Preferably, the end region may extend from the trailing edge in the direction of the leading edge with an extent of less than 50% of the trailing-edge region, in particular of less than 30% of the trailing-edge region, in particular of less than 10% of the trailing-edge region.

Particularly preferably, the mean line may have an S-bend in the region of the trailing edge.

The mean line may preferably have the mathematically positive curvature in particular in a region from the trailing edge in the direction of the leading edge with an extent between 20% and 0% of the length of the profile chord, in particular between 10% and 0% of the length of the profile chord.

It is particularly preferable for the mean line to have, in the region in which the mean line is defined by the convex region extending on the pressure side from the trailing edge and the convex region extending on the suction side from the trailing edge, a rear local minimum, which is situated below the profile chord, and/or for the mean line to have, in a region in which the mean line is defined by a convex region extending on the pressure side from the leading edge and the convex region extending on the suction side from the leading edge, a front local minimum, which is situated below the profile chord.

Where reference is made in the present case to directional indications relating to the minimum or the minima, such as for example rear local minimum and/or front local minimum, these refer in particular to a position relative to the profile, wherein in particular the leading edge is to be understood as meaning the front end of the profile and the trailing edge is to be understood as meaning the rear end of the profile. Thus, in particular, the front local minimum can be situated further in the direction of the leading edge than the rear local minimum.

Preferably, the convex region on the suction side and/or the convex region on the pressure side may extend from the leading edge in the direction of the trailing edge with an extent of between 0% and 60% of the length of the profile chord.

Particularly preferably, the mean line has the front local minimum and the rear local minimum, wherein the pressure side has a concave region in a region which is situated between the convex region extending from the leading edge and the convex region extending from the trailing edge, wherein preferably the rear local minimum or the front local minimum is an absolute minimum.

According to a particularly preferred development, it is provided that the entire mean line extends below the profile chord. Accordingly, the mean line may preferably extend in a region between the profile chord and the pressure side.

It is furthermore preferable for the trailing edge to be a closed trailing edge or a flat trailing edge, wherein a height of the flat trailing edge is less than 40%, preferably less than 20%, preferably less than 10%, of the maximum profile thickness which is established between the suction side and the pressure side, and/or is possibly approximately 50% of the distance between the outer contour edge of the arrangement and the suction-side flow-off edge.

In a further preferred development of the rotor blade, it is provided that the profile has a thickness setback, which defines a ratio of a distance of a maximum profile thickness from the leading edge in the direction of the profile chord and the length of the profile chord, wherein the ratio is preferably less than 40%.

According to a further aspect, the object stated in the introduction is achieved by a wind power installation having at least one rotor blade as described above.

According to a further aspect, the object stated in the introduction is achieved by a method for designing a rotor blade which extends in a longitudinal direction with a profile course from a blade connector to a blade tip, comprising the steps of: selecting at least one profile for the profile course, comprising a suction side and a pressure side, a relative profile thickness of greater than 25%, a profile chord, which extends between a leading edge and a trailing edge of the profile and has a length which defines a profile depth, a mean line which extends at least partially below the profile chord, a convex region which extends on the suction side from the trailing edge, and a convex region which extends on the pressure side from the trailing edge, wherein the convex region on the pressure side defines a rounded transition region of the pressure side to the trailing edge, preferably adapting a height course of a profile by arranging on the rounded transition region an arrangement for aerodynamic flow manipulation, wherein selecting the at least one profile and/or adapting the height course are/is based at least partially on a calculation of an annual energy yield to be achieved and/or a determination of location-specific load situations to be expected.

A particularly preferred embodiment provides that the height course of the profile is adapted in such a way that a distance between an outer contour edge of the arrangement and a suction-side flow-off edge is at least 10% of a maximum profile thickness which is established between the suction side and the pressure side, and preferably further comprises the step of: adapting a local lift coefficient, in particular to an operating state of a wind power installation, through orientation of the arrangement by moving the arrangement from a first position, in which the distance between an outer contour edge of the arrangement and a suction-side flow-off edge is at least 10% of the maximum profile thickness which is established between the suction side and the pressure side, in the direction of a second position, which describes a lift-reduced configuration in which the distance between the outer contour edge of the arrangement and the suction-side flow-off edge is reduced, and/or moving the arrangement from a second position, which describes a lift-reduced configuration in which the distance between the outer contour edge of the arrangement and the suction-side flow-off edge is less than 10% of the maximum profile thickness which is established between the suction side and the pressure side, in the direction of a first position, in which the distance between an outer contour edge of the arrangement and a suction-side flow-off edge is at least 10% of the maximum profile thickness which is established between the suction side and the pressure side.

BRIEF DESCRIPTION OF THE SEVERAL VIEWS OF THE DRAWINGS

For further advantages, embodiment variants and embodiment details of the further aspects and their possible developments, reference is also made to the description given above concerning the corresponding features and developments.

Preferred exemplary embodiments will be described by way of example on the basis of the appended figures. In the figures:

FIG. 2A shows a view of a profile with a rounded transition region of the pressure side to the trailing edge;

FIG. 2B shows a view of a profile with a rounded transition region of the pressure side to the trailing edge;

DETAILED DESCRIPTION

In the figures, identical or substantially functionally identical elements are denoted by the same reference signs. General descriptions relate as a rule to all the embodiments, unless differences are explicitly indicated.

The explanation of the invention on the basis of examples with reference to the figures is substantially schematic, and, for the sake of better illustration, the elements which are explained in the respective figure may be exaggerated in it and other elements may be simplified. In this regard, for example, FIG. 1 schematically illustrates a wind power installation such that the configuration of the individual profiles of the profile course cannot be seen.

Figure 1:
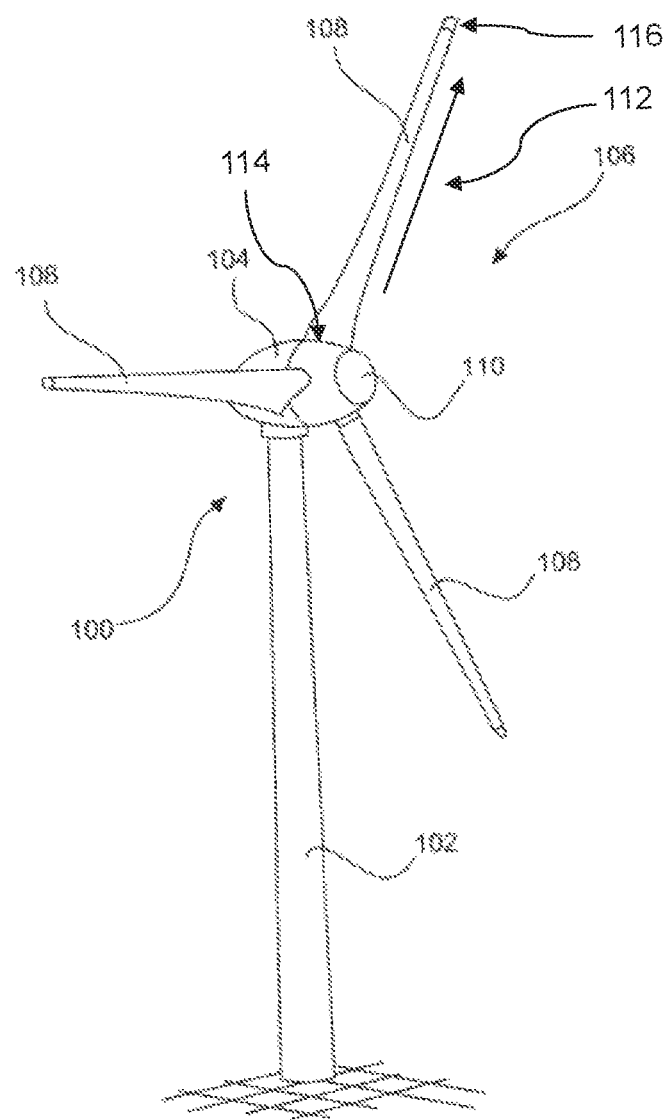
FIG. 1 shows a schematic three-dimensional view of an exemplary embodiment of a wind power installation.

FIG. 1 shows a schematic three-dimensional view of a wind power installation 100. The wind power installation 100 has a tower 102 and a nacelle 104 on the tower 102. An aerodynamic rotor 106 having three rotor blades 108 and having a spinner 110 is provided on the nacelle 104. At least one of the rotor blades has a profile course with at least one profile which has in each case a convex region which extends on the suction side from the trailing edge and a convex region which extends on the pressure side from the trailing edge (not visible in FIG. 1), as is shown for example in FIGS. 2 to 7. During the operation of the wind power installation 100, the aerodynamic rotor 106 is set in rotational motion by the wind and thereby also rotates an electrodynamic rotor or runner of a generator, which is coupled directly or indirectly to the aerodynamic rotor 106. The electric generator is arranged in the nacelle 104 and generates electrical energy.

At least one of the rotor blades 108 shown in FIG. 1 extends in particular in a longitudinal direction 112 with a profile course from a blade connector 114 to a blade tip 116. Here, the profile course comprises in particular at least one profile (not shown in FIG. 1) as described below.

FIGS. 2A to 4B each show a profile 200 with a suction side 201 and with a pressure side 202, which is opposite the suction side 201, in different embodiment variants. The profile 200 preferably has a relative profile thickness, that is to say in particular a maximum thickness of the profile perpendicular to the profile chord 203 in relation to the profile chord length, of greater than 25%. Here, the profile chord length is defined as the length of the profile chord 203, which extends from the leading edge 204 to the trailing edge 205. From the trailing edge 205, there extends both a convex region 206 on the suction side 201 and a convex region 207 on the pressure side.

As FIGS. 2A to 4B show, the pressure side 202 and/or the suction side 201 may have in particular further convex regions and/or concave regions. For example, the pressure side 202 may have, proceeding from the leading edge 204, a first convex region 217, a concave region 227 adjoining the first convex region 204, and, adjoining the concave region 227, a second convex region 207. Such a course of the pressure side 202 is shown for example in FIGS. 2A to 3B. In particular, the pressure side 202 and/or the suction side 201 may be of convex form overall.

FIG. 2A shows a profile 200 with a closed trailing edge 205, in the case of which the profile chord 203 preferably extends from the leading edge 204 to a point to which the profile converges, said point being referred to as trailing edge 205. FIG. 2B, by contrast, shows a trailing edge with a pressure-side flow-off edge 225 and with a suction-side flow-off edge 215 at a distance therefrom. As trailing edge 205, for determining the profile depth, use is made of a central point between the suction-side flow-off edge 215 and the pressure-side flow-off edge 225. The profiles 200 shown in FIGS. 2A and 2B each have a mean line 230 which extends below the profile chord 203.

The mean line 230 has, in the region in which it is defined by the convex region 207 extending on the pressure side 202 from the trailing edge 205 and the convex region 206 extending on the suction side 201 from the trailing edge 205, a rear local minimum 231. The rear local minimum 231 is situated below the profile chord 203. The mean line 230 furthermore has, in a region in which the mean line 230 is defined by a convex region 217 extending on the pressure side 202 from the leading edge 204 and the convex region 216 extending on the suction side 201 from the leading edge 204, a front local minimum 232.

In the embodiment variants shown in FIGS. 2A and 2B, the front local minimum 232 is also situated below the profile chord 203. In the examples shown here, the front local minimum 232 is the absolute minimum.

The pressure side 202 has a concave region 227 in a region between the convex region 207 and the convex region 217.

Figures 3A, 3B:
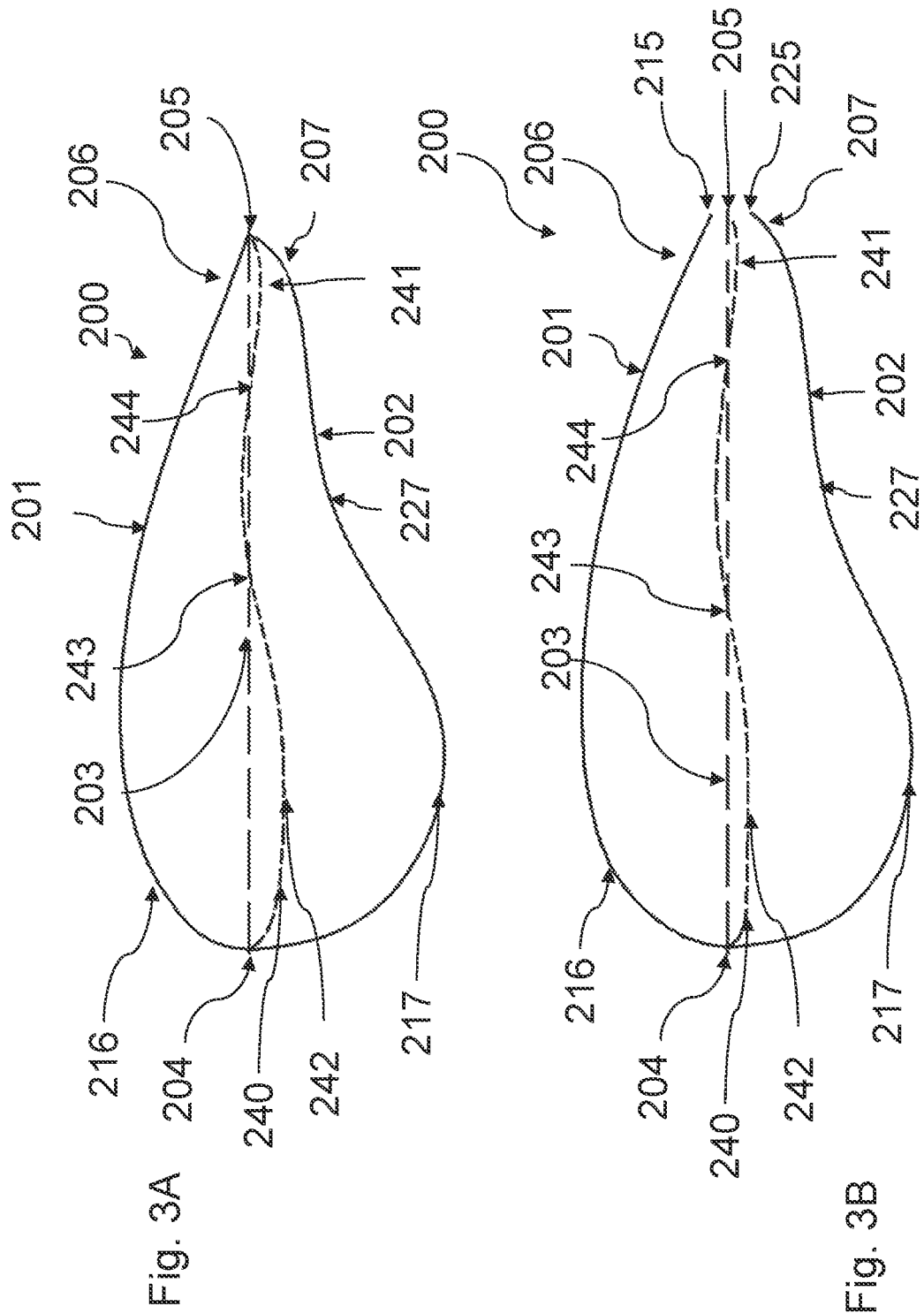
FIG. 3A shows a view of a profile with a rounded transition region of the pressure side to the trailing edge.
FIG. 3B shows a view of a profile with a rounded transition region of the pressure side to the trailing edge.

FIG. 3A shows a profile 200 with a closed trailing edge 205, in the case of which the profile chord 203 preferably extends from the leading edge 204 to a point to which the profile converges, said point being referred to as trailing edge 205. FIG. 3B, by contrast, shows a trailing edge with a pressure-side flow-off edge 225 and with a suction-side flow-off edge 215 at a distance therefrom. As trailing edge 205, for determining the profile depth, use is made of a central point between the suction-side flow-off edge 215 and the pressure-side flow-off edge 225. The profiles 200 shown in FIGS. 3A and 3B each have a mean line 240 which extends below the profile chord 203.

The mean line 240 has, in the region in which it is defined by the convex region 207 extending on the pressure side 202 from the trailing edge 205 and the convex region 206 extending on the suction side 201 from the trailing edge 205, a rear local minimum 241. The rear local minimum 241 is situated below the profile chord 203. The mean line 240 furthermore has, in a region in which the mean line 240 is defined by a convex region 217 extending on the pressure side 202 from the leading edge 204 and the convex region 216 extending on the suction side 201 from the leading edge 204, a front local minimum 242.

In the embodiment variants shown in FIGS. 3A and 3B, the front local minimum 242 is also situated below profile chord 203.

The pressure side 202 has a concave region 227 in a region between the convex region 216 and the convex region 217. In the examples shown here, the front local minimum 242 is the absolute minimum. In the examples shown here, the mean line 240 extends at least partially above the profile chord 203. The mean line 240 intersects the profile chord 203 between the rear local minimum 241 and the front local minimum 242 at a first point of intersection 243 and at a second point of intersection 244. In this case, the mean line 240 extends above the profile chord 203 between the first point of intersection 243 and the second point of intersection 244.

Figure 4A:
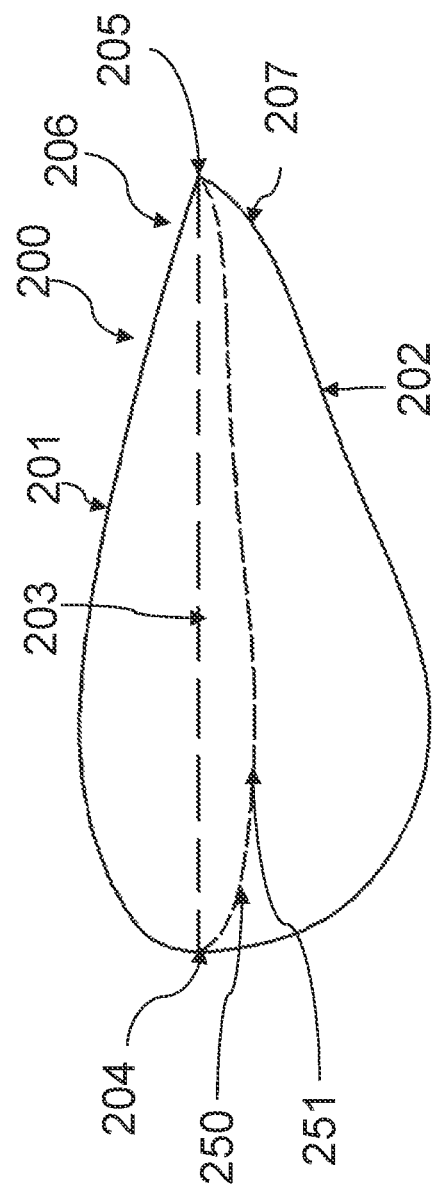
FIG. 4A shows a view of a profile with a rounded transition region of the pressure side to the trailing edge.
Figure 4B:
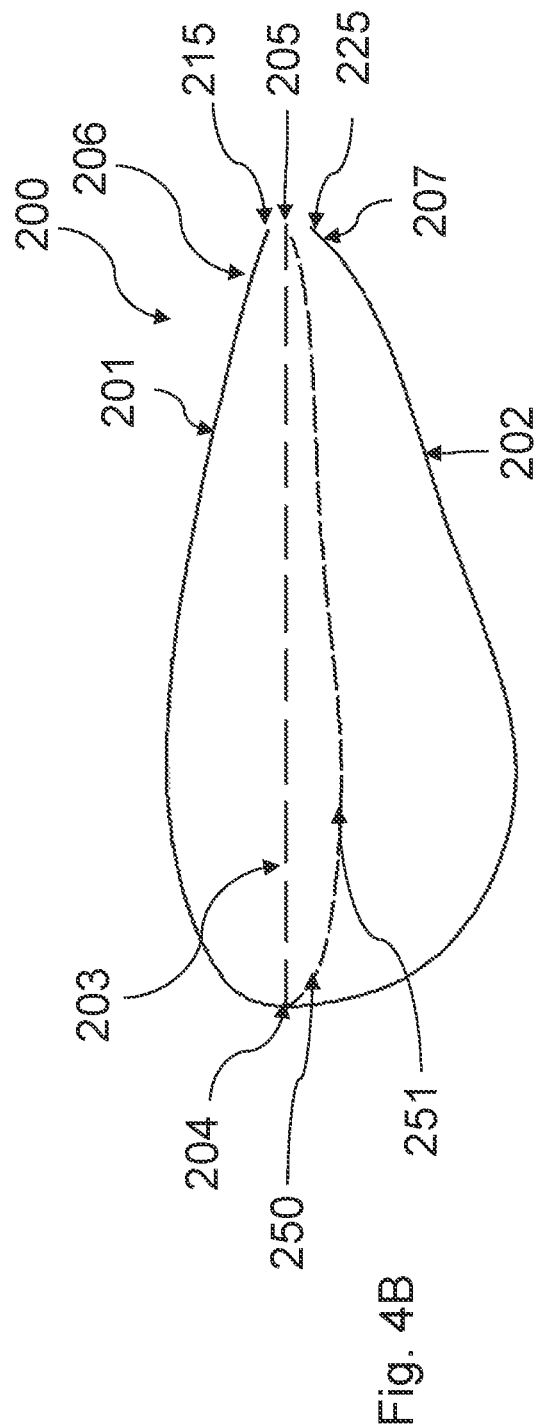
FIG. 4B shows a view of a profile with a rounded transition region of the pressure side to the trailing edge.

FIG. 4A shows a profile 200 with a closed trailing edge 205, in the case of which the profile chord 203 preferably extends from the leading edge 204 to a point to which the profile converges, said point being referred to as trailing edge 205. FIG. 4B, by contrast, shows a trailing edge with a pressure-side flow-off edge 225 and with a suction-side flow-off edge 215 at a distance therefrom. As trailing edge 205, for determining the profile depth, use is made of a central point between the suction-side flow-off edge 215 and the pressure-side flow-off edge 225.

The profiles shown in FIGS. 4A and 4B each have a mean line 250 which extends below the profile chord 203 and has a mathematically positive curvature. The positive curvature is defined by the substantially convex pressure side 202 and the substantially convex suction side 201. In this case, the mean line 250 has a single minimum 251, which is situated below the profile chord 203.

Figure 5:
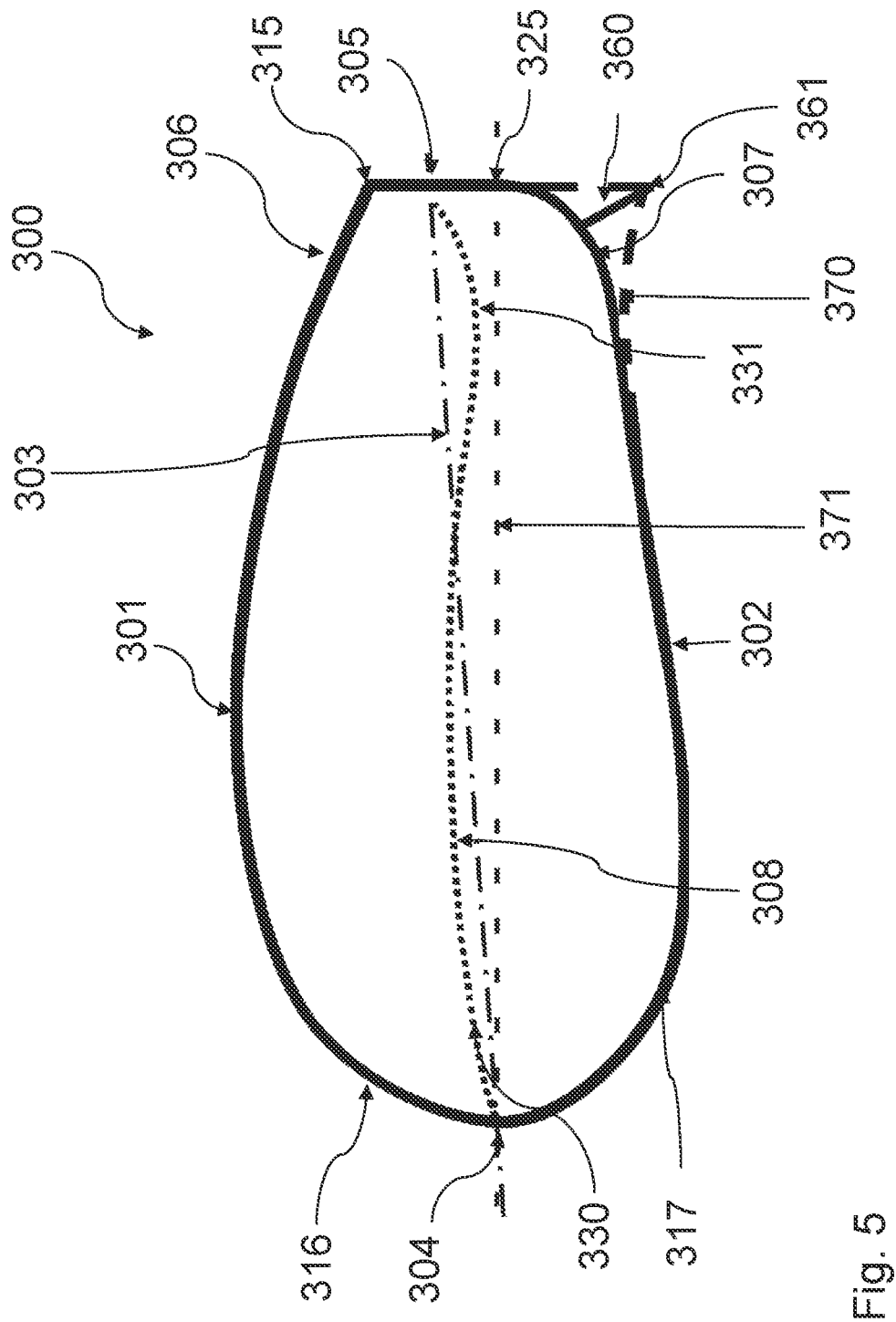
FIG. 5 shows a view of a profile with a rounded transition region of the pressure side to the trailing edge and an arrangement for aerodynamic flow manipulation.
Figure 6:
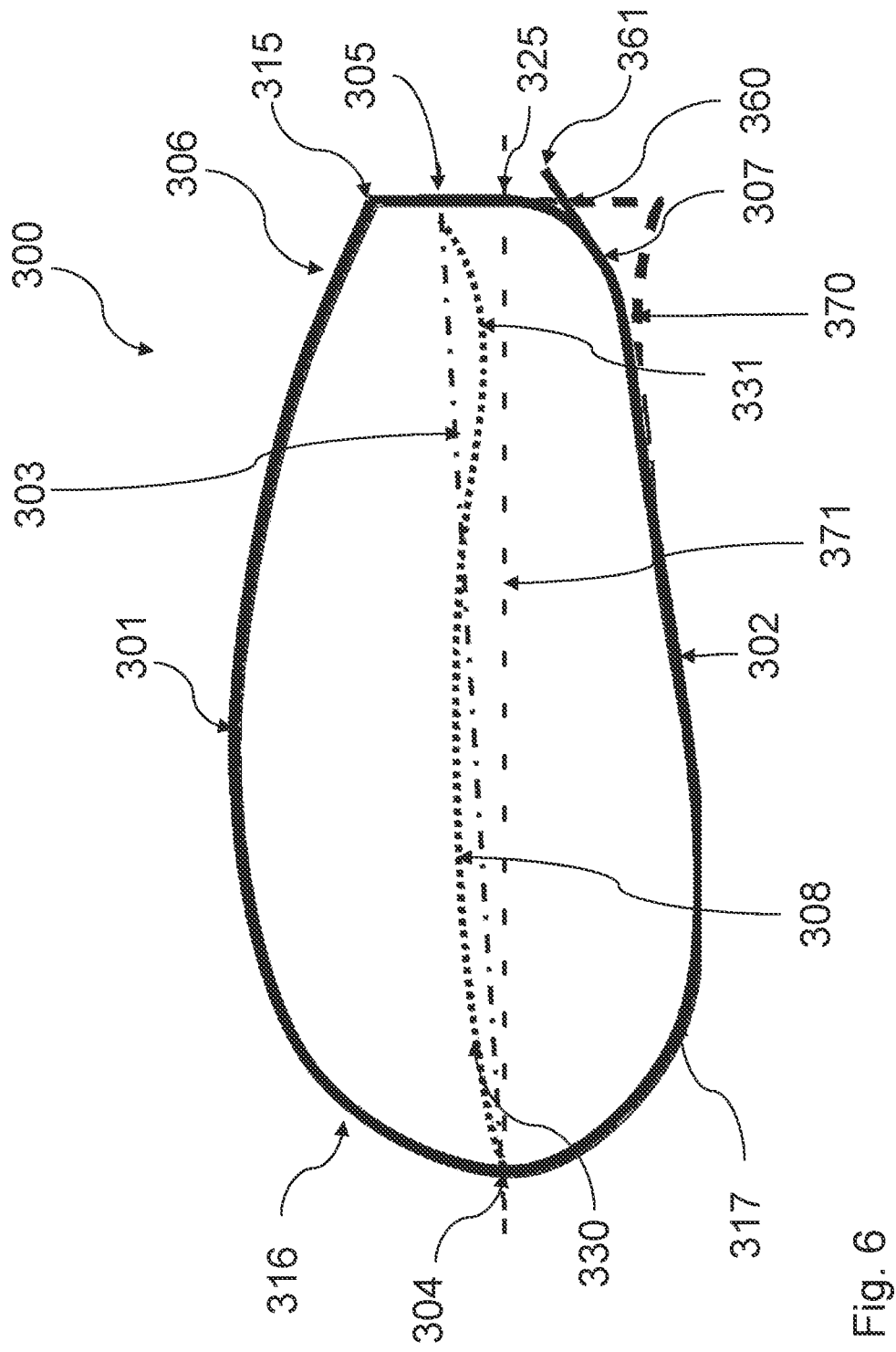
FIG. 6 shows a view of a profile with a rounded transition region of the pressure side to the trailing edge and an arrangement for aerodynamic flow manipulation.

FIGS. 5 and 6 each show a profile 300 with a suction side 301 and with a pressure side 302, which is opposite the suction side 301. The profile 300 preferably has a relative profile thickness of greater than 25%. The profile chord 303 extends from the leading edge 304 to the trailing edge 305. From the trailing edge 305, there extends a convex region 306 on the suction side 301 and a convex region 307 on the pressure side. The convex region 307 defines a rounded transition region on which an arrangement 360 for aerodynamic flow manipulation is arranged. In the embodiment variant shown here, by way of example, a Gurney flap is schematically illustrated as arrangement 360.

The profile 300 has a trailing edge with a pressure-side flow-off edge 325 and with a suction-side flow-off edge 315 at a distance therefrom. As trailing edge 305, for determining the profile depth, use is made of a central point between the suction-side flow-off edge 315 and the pressure-side flow-off edge 325. The profiles 300 shown in FIGS. 5 and 6 each have a mean line 330 which extends partially below the profile chord 303. The mean line 330 has, in the region in which it is defined by the convex region 307 extending on the pressure side 302 from the trailing edge 305 and the convex region 306 extending on the suction side 301 from the trailing edge 305, a minimum 331. The minimum 331 is situated below the profile chord 303. The mean line 330 furthermore has, in a region in which the mean line 330 is defined by a convex region 317 extending on the pressure side 302 from the leading edge 304 and the convex region 316 extending on the suction side 301 from the leading edge 304, a maximum 308, which is situated above the profile chord 303.

In FIG. 5, the arrangement 360 is in a first position, in which the outer contour edge 361 of the arrangement 360 is at a distance from the pressure-side flow-off edge 325, and thus also from the suction-side flow-off edge 315. This distance may in particular be at least 10% of the maximum profile thickness which is established between the suction side 301 and the pressure side 302. In FIG. 6, the arrangement 360 is in a second position, which describes a lift-reduced configuration in which the distance between the outer contour edge 361 of the arrangement 360 and the pressure-side flow off edge 325, and thus also the suction-side flow-off edge 315, is reduced.

Particularly preferably, the arrangement 360 can be moved from the first position into the second position. Preferably, the arrangement 360 can in this case be configured to be actively controllable for lift control.

FIGS. 5 and 6 show that the arrangement 360 is configured to adapt a height course of the profile 300. By way of the arrangement 360 in the first position (illustrated in FIG. 5), the outer contour edge 361 can function as a pressure-side flow-off edge. In this way, the height course of the profile can correspond approximately to a height course of a flat back profile 370 with a corresponding profile chord 371. A trailing edge defining said profile chord 371 coincides in this case with the pressure-side flow-off edge 325. Said trailing edge is a central point between the outer contour edge 361 of the arrangement 360 and the suction-side flow-off edge 315.

Figure 7:
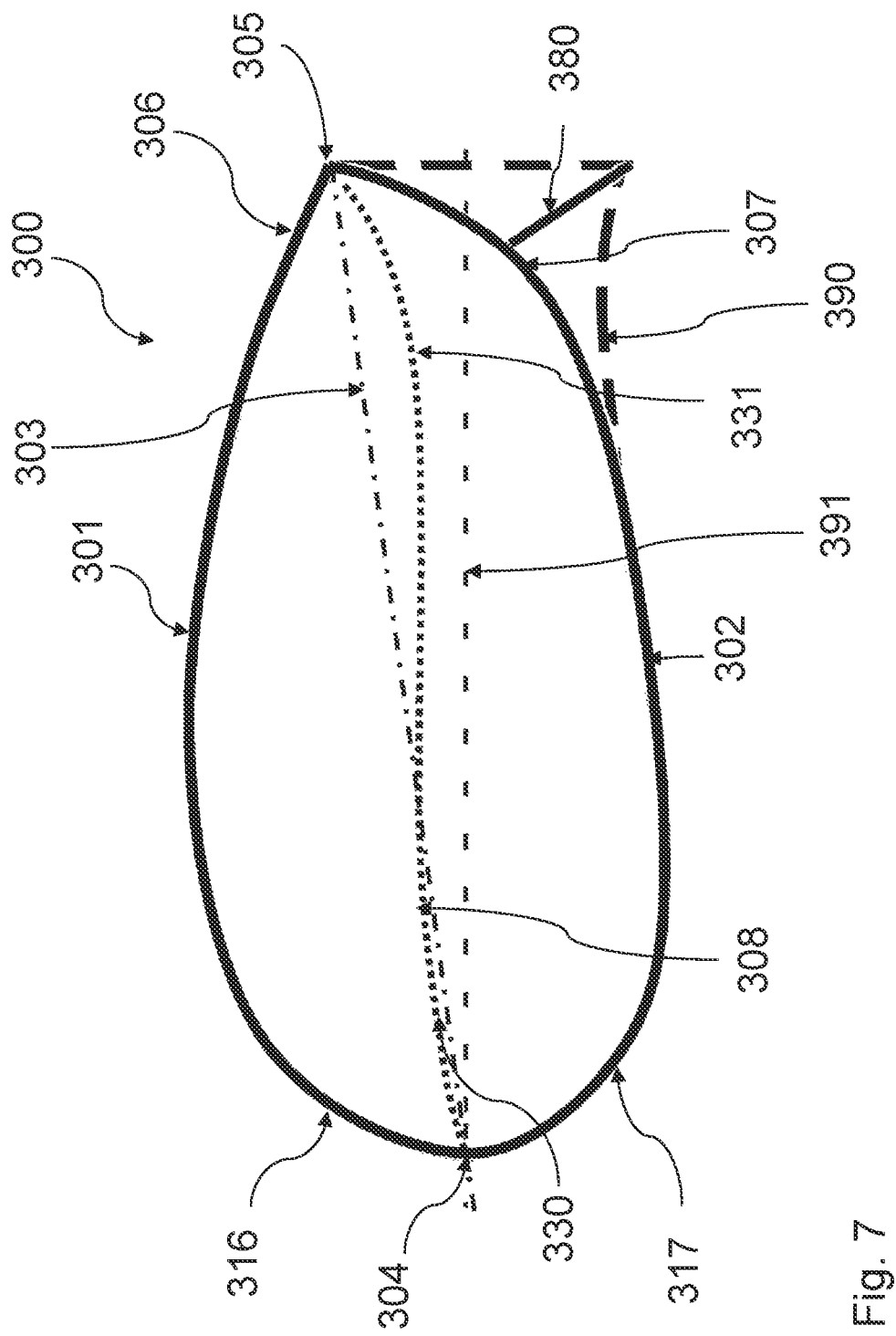
FIG. 7 shows a view of a profile with a rounded transition region of the pressure side to the trailing edge and an arrangement for aerodynamic flow manipulation.

FIG. 7 also shows a profile 300 with a suction side 301 and with a pressure side 302, which is opposite the suction side 301. The profile 300 preferably has a relative profile thickness of greater than 25%. The profile chord 303 extends from the leading edge 304 to the closed trailing edge 305. From the trailing edge 305, there extends a convex region 306 on the suction side 301 and a convex region 307 on the pressure side.

The profile has a mean line 330 which extends partially below the profile chord 303. The mean line 330 has, in the region in which it is defined by the convex region 307 extending on the pressure side 302 from the trailing edge 305 and the convex region 306 extending on the suction side 301 from the trailing edge 305, a minimum 331. The minimum 331 is situated below the profile chord 303. The mean line 330 furthermore has, in a region in which the mean line 330 is defined by a convex region 317 extending on the pressure side 302 from the leading edge 304 and the convex region 316 extending on the suction side 301 from the leading edge 304, a maximum 308, which is situated above the profile chord 303.

The convex region 307 defines a rounded transition region on which an arrangement 380 for aerodynamic flow manipulation is arranged. In the embodiment variant shown here, by way of example, a Gurney flap is schematically illustrated as arrangement 380. The arrangement 380 may in particular be fixedly installed or be actively controllable in order to adapt a height course of the profile 300 and to act as a pressure-side flow-off edge.

In comparison with the arrangement 360 shown in FIG. 5, the arrangement 380 has a larger length. In particular, the larger the radius of the rounding of the transition region is, the larger a length of an arrangement 360 may be. In this way, the height course of the profile 300 can be optimally adapted in order to correspond approximately to a height course of a flat back profile 390 with a corresponding profile chord 391.

Figure 8:
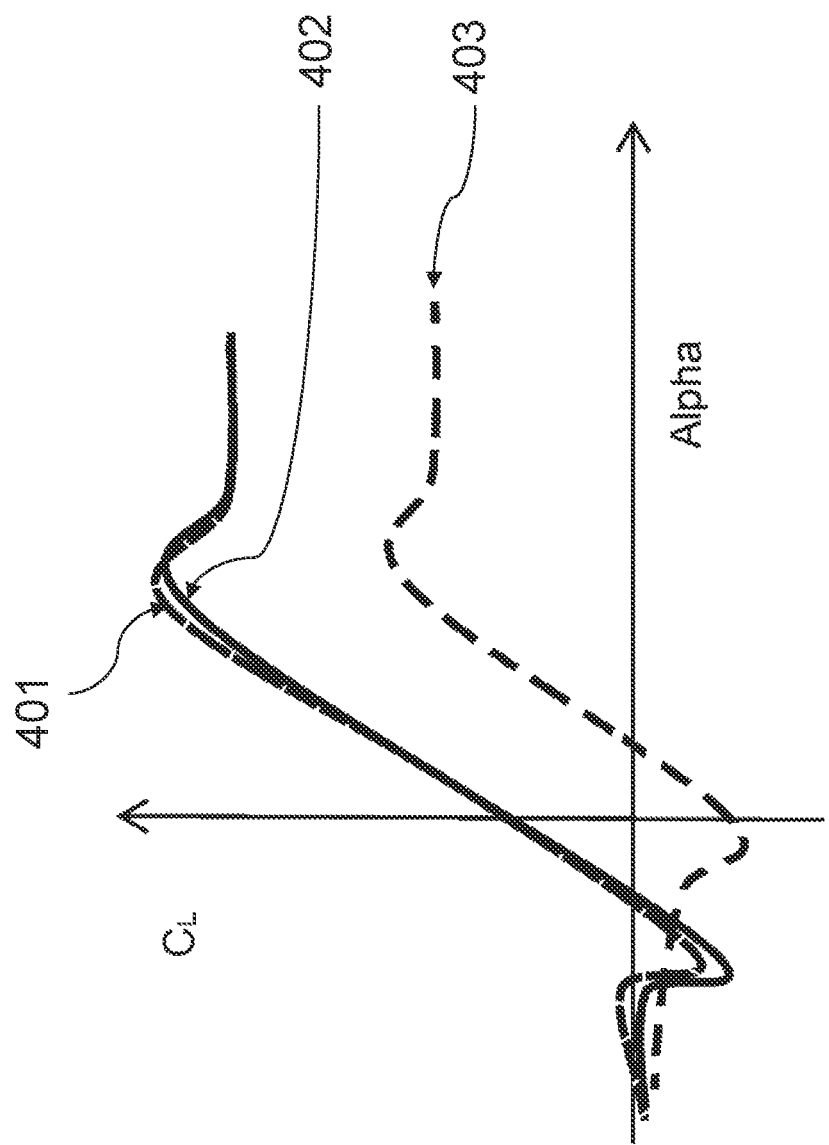
FIG. 8 shows a diagram in which lift coefficients of different profiles are illustrated.

FIG. 8 presents a diagram which illustrates lift coefficients CL of different profiles as a function of the angle of attack a. Three graphs 401, 402, 403 can be seen in FIG. 8, wherein graph 401 illustrates the lift coefficients of a profile with a rounded transition region on the pressure side to the trailing edge with an arrangement for aerodynamic flow manipulation, graph 402 illustrates the lift coefficients of a flat back profile, and graph 403 illustrates the lift coefficients of a profile with a rounded transition region on the pressure side to the trailing edge without an arrangement for aerodynamic flow manipulation.

Comparison of the graphs 402 and 403 shows that the rounded transition region on the pressure side to the trailing edge brings about a significant loss in lift potential at the same angle of attack. The attachment of the arrangement for aerodynamic flow manipulation to the rounded transition region, as described above, gives rise to optimized lift coefficients, which are comparable with the lift coefficients of the flat back profile. This comparison is shown by the graphs 401 and 402.

Rotor blades having profiles of said type and wind power installations having said rotor blades have various advantages. In particular, it is possible by way of the above-described exemplary embodiments for lift coefficients to be adapted according to requirement. It is furthermore advantageous that, through the proposed solution, overall, it is possible to increase an efficiency of a wind power installation and consequently in particular an annual yield. Moreover, both the outlay and the costs of production can be reduced and at the same time weight can be saved.

LIST OF REFERENCE SIGNS

100 Wind power installation
102 Tower
104 Nacelle
106 Rotor
108 Rotor blade
110 Spinner
112 Longitudinal direction
114 Blade connector
116 Blade tip
200 Profile
201 Suction side
202 Pressure side
203 Profile chord
204 Leading edge
205 Trailing edge
206 Convex region
207 Convex region
215 Suction-side flow-off edge
216 Convex region
217 Convex region
225 Pressure-side flow-off edge
227 Concave region
230 Mean line
231 Local minimum
232 Local minimum
240 Mean line
241 Local minimum
242 Local minimum
243 First point of intersection
244 Second point of intersection
250 Mean line
251 Minimum
300 Profile
301 Suction side
302 Pressure side
303 Profile chord
304 Leading edge
305 Trailing edge
306 Convex region
307 Convex region
315 Suction-side flow-off edge
325 Pressure-side flow-off edge
330 Mean line
331 Minimum
308 Maximum
360 Arrangement
361 Outer contour edge
370 Height course of a flat back profile
371 Profile chord
380 Arrangement
390 Height course of a flat back profile
391 Profile chord
401 Graph
402 Graph
403 Graph The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade for a wind power installation, comprising:
a body extending in a longitudinal direction with a profile course from a blade connector to a blade tip,
wherein the profile course contains a profile, comprising:
a suction side and a pressure side,
a profile chord extending between a leading edge and a trailing edge of the profile and having a length defining a profile depth,
a relative profile thickness of greater than 25% of the length of the profile chord,
a mean line extending at least partially below the profile chord,
a convex region extending on the suction side from the trailing edge, and
a convex region extending on the pressure side from the trailing edge,
wherein the convex region on the pressure side defines a rounded transition region of the pressure side to the trailing edge,
wherein the mean line has, in a region in which the mean line is defined by the convex region extending on the pressure side from the trailing edge and the convex region extending on the suction side from the trailing edge, a rear local minimum situated below the profile chord, and/or
wherein the mean line has, in a region in which the mean line is defined by a convex region extending on the pressure side from the leading edge and the convex region extending on the suction side from the leading edge, a front local minimum situated below the profile chord.

2. The rotor blade as claimed in claim 1, comprising both the front local minimum and the rear local minimum,
wherein the pressure side has a concave region in a region which is situated between the convex region extending from the leading edge and the convex region extending from the trailing edge, and
wherein the rear local minimum or the front local minimum is an absolute minimum.

3. The rotor blade as claimed in claim 1, wherein the trailing edge is:
a closed trailing edge, or
a flat trailing edge, wherein a height of the flat trailing edges less than 40% of the maximum profile thickness which is established between the suction side and the pressure side.

4. The rotor blade as claimed in claim 1, wherein the profile has a thickness setback, which defines a ratio of a chordwise distance between the leading edge and a location of a maximum profile thickness, wherein the maximum profile thickness which is between the suction side and the pressure side, wherein the ratio is less than 40%.

5. A wind power installation comprising a tower, a nacelle, and at least one rotor blade as claimed in claim 1.

6. A rotor blade for a wind power installation, comprising:
a body extending in a longitudinal direction with a profile course from a blade connector to a blade tip,
wherein the profile course contains a profile, comprising:
a suction side and a pressure side,
a profile chord extending between a leading edge and a trailing edge of the profile and having a length defining a profile depth,
a relative profile thickness of greater than 25% of the length of the profile chord,
a mean line extending at least partially below the profile chord,
a convex region extending on the suction side from the trailing edge, and
a convex region extending on the pressure side from the trailing edge,
wherein the convex region on the pressure side defines a rounded transition region of the pressure side to the trailing edge,
wherein the entire mean line extends below the profile chord.

* * * * *